Sept. 29, 1931.  J. R. OISHEI  1,824,921

VEHICLE HEATER

Filed May 11, 1927

Inventor

John R. Oishei by Barton A. Bean Jr.
Atty.

Patented Sept. 29, 1931

1,824,921

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

VEHICLE HEATER

Application filed May 11, 1927. Serial No. 190,519.

This invention relates to a vehicle heater and is especially designed for the heating of windshields or the interior of motor vehicles of the internal combustion type.

The heating of the interior of the vehicle has usually been accomplished by the exhaust gases from the internal combustion engine, which gases have heretofore been shunted or deflected from the exhaust line through a heater arranged within the floor or at any other desirable point of the car, the exhaust gases from thence being returned to the exhaust line or permitted to escape to the atmosphere direct. Through faulty construction or improper installation of the heater, it sometimes happens that the exhaust gases will escape from the heater into the interior of the car and jeopardize the lives of the passengers.

When the heater is arranged in proximity to the windshield for heating the same an overheating of the adjacent parts must be guarded against, and by reason of the possibility of such overheating it is inadvisable to conceal such a heater from view. Consequently, the installation of a heater upon a windshield is not desirable because of its failure to harmonize with the interior finish or trimmings of the vehicle.

The present invention has for its objects to provide a motor vehicle heater in which the heat is derived from preheated atmospheric air so that if by chance the heater does leak the escape of the heated fluid will not be dangerous to the occupants of the vehicle; to provide a vehicle heater which may be readily connected to the intake manifold whereby the suction obtaining therein will cause a current of air to pass from the heater into the manifold, which air is preheated before entering the vehicle heater; to provide a novel construction of a preheater which may be easily and readily installed on the exhaust line of the engine so that the air passing through the preheater will have its temperature raised to the desired degree by the heat radiating from the exhaust line for the proper functioning of the vehicle heater; to provide a vehicle heater especially designed for the heating of the windshield glass for preventing the accumulation or congealing of frozen moisture upon its surface; and to provide for the mounting of the windshield heater within the windshield frame so as to not only be concealed from view but to insure the proper and even heating of the windshield glass throughout its breadth.

Referring more in detail to the accompanying drawings.

Figure 1:
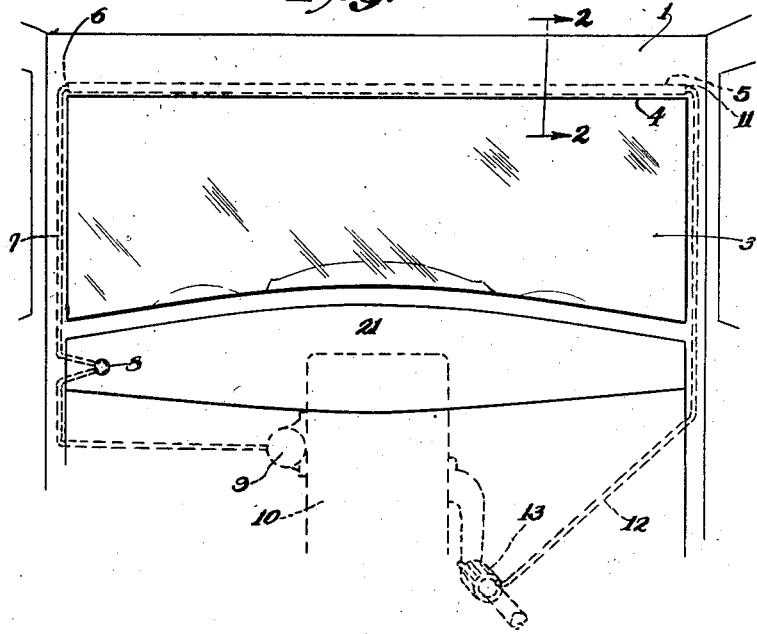
Figure 1 is an elevation of the interior of a motor vehicle showing the present invention designed for the heating of the windshield.

Proceeding in accordance with the present invention the numeral 1 indicates the front wall structure or windshield frame of a motor vehicle body having formed therein a groove 2 in which the upper edge of the glass 3 is vertically slidable to a limited extent for effecting ventilation beneath the lower edge of the glass. In one wall of the groove 2, preferably the rear wall, is provided a pocket 4 extending the full breadth of the glass, and across the open side of which the glass 3 slides. Within this pocket 4 is arranged the vehicle heater, which, in the present showing, is designed primarily for heating the windshield glass, said heater in its simplest form comprising a tubular body 5 of a desired size and length to substantially fill the pocket 4 and have more or less peripheral contact with the glass 3. This tubular body being of a metal having a high degree of heat conductivity is connected at its outlet end 6 by a conduit 7, in which is interposed a control valve 8, to the intake manifold 9 of the motor vehicle engine 10. The inlet end 11 of the heater body 5 is connected by a conduit 12 to an air preheater 13.

This air-preheater comprises a body which may readily be clamped about or to the exhaust line, the body preferably being flexible or hinge-like and provided with a circuitous air passage opening at one end to the atmosphere and having is opposite end connected to the conduit 12. This air-preheater may embody component sections of a casting, the sections of which are suitably hinged together for engaging about the exhaust pipe, although in its preferred embodiment the air preheater is formed from a length of tube bent upon itself at intervals so as to form a series of parallel and connected loops 14, the legs or sides 15 of which lie in contacting relation substantially throughout their entire length. Such a construction provides an air passage through the entire preheater body having a zigzag or circuitous course, the inner side wall of which is in direct contact throughout with the exterior surface of the exhaust line 16 of the motor vehicle engine. The terminals of the pipe or tubing from which the preheater body is formed are preferably extended beyond the body lines in opposite directions, thereby forming an atmospheric air-inlet nipple 17 and a heated air-outlet nipple 18 to which the conduit 12 is connected. The body thus formed is of a flexible nature so as to readily yield and conform to the peripheral contour of the exhaust line 16. In forming the preheater body the loops are formed in a common plane so that the resultant structure will be a flat body such as is indicated by the dotted showing 19. When the preheater is to be attached to the exhaust line the flexible body is bent around the exhaust line with the leg portions 15 extending substantially parallel to the axis of the exhaust line, in which position the body is secured, as by means of a simple form of clamp 20. The adjacent portions of the several loops may be secured together adhesively, as by dipping the formed body in solder or other binder.

By reason of the circuitous passage formed through the several connected loops, each portion of which passage is in direct contact with the exhaust line and therefore subjected to the intense heat radiating therefrom, the cool atmospheric air entering through the inlet nipple 17 will be heated to a very high temperature before it leaves the outlet nipple 18 and passes on to the windshield heater 5. If desired the several loops may be flattened so as to decrease the radial distance of the wall portion of the circuitous passage from the exhaust line thereby giving greater contact with the exhaust line and a resultant increase in the temperature of the heated air.

In operation the driver will open the valve 8 which is arranged in an accessible position, such as on the instrument board 21, so as to establish more or less open communication between the intake manifold 9 and the heater 5, whereupon the suction obtaining within the intake manifold, while the engine is running, will induce a flow of air through the air-preheater 13, where it is highly heated, and on through the windshield heater 5, from which the air is drawn into the manifold. The heated air entering the intake manifold also naturally better prepares the combustible mixture for explosion within the vehicle engine.

Figure 2:
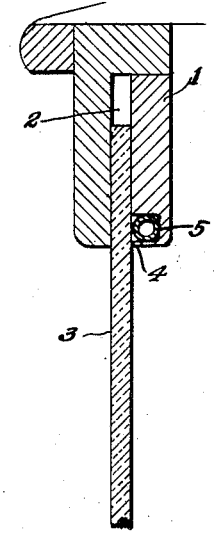
Figure 2 is a detailed sectional view therethrough on line 2—2 of Figure 1.
Figure 4:
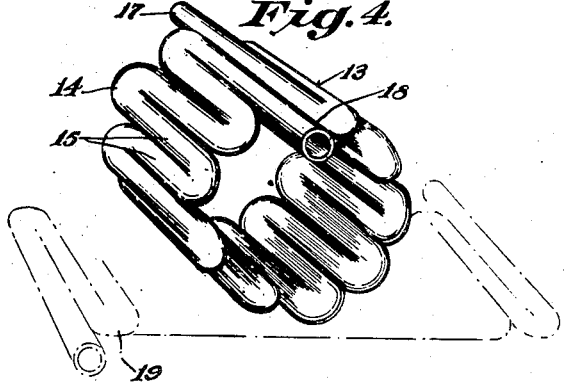
Figure 4 is a detailed perspective of the air-preheater, indicating in dotted lines the normally flat formation thereof.
Figure 3:
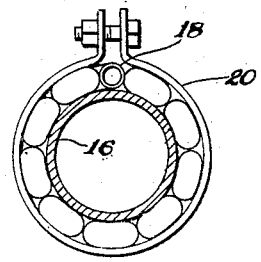
Figure 3 is an end elevation of the air-preheater as applied to the exhaust line of the motor vehicle engine, the exhaust line being depicted in cross section.

The heater fluid which passes through the heater 5, being drawn directly from the atmosphere, provides a heating fluid which in case of leakage or faulty installation will not injure the health or jeopardize the lives of the passengers within the car. Since the flow of fluid heat is an induced flow the noises incident to the explosions within the engine are avoided being carried by the heated air to the vehicle heater 5, and having the latter arranged substantially in contact with the glass the heat will travel by induction down across the field of vision for the entire breadth of the windshield and thereby heat that portion of the glass at a temperature which will remedy and avoid the congealing of moisture on its exterior surface. Since there is no danger of any escape of poisonous fumes or gases from the current of fluid heat the heater may safely be concealed within the body structure of the windshield frame as is clearly shown in Figure 2 wherein the heater is snugly disposed within the pocket 4.

By enlarging the heater 5 and exposing it more or less to the interior of the car the heater will also radiate its heat to the benefit and comfort of the passengers. Obviously another heater of proper design and proportion could be arranged in the floor of the car and connected by branch passages to the conduits 7 and 12.

I claim:—

1. In a warm-air vehicle heater, a flexible air-pre-heater body formed from a single length of pipe folded back and forth upon itself in zigzag formation to provide a flexible body with a circuitous passage therethrough open at its opposite ends, said body being foldable about the exhaust line of the vehicle with the superimposed legs of the folds extending substantially parallel to the axis of the exhaust line, the opposite ends of the pipe being extended from each other in opposite directions; and means for securing the flexible body folded about the exhaust line.

2. In a warm-air vehicle heater a preheater body bent from a single length of pipe with each succeeding reach of the pipe lying contiguous to the preceding reach, the extremities of each bend lying in spaced planes angular to the body of the heater, said body being foldable about the exhaust line of the vehicle, the opposite ends of the pipe extending beyond the body of the heater in opposite directions substantially parallel to the axis of the body and the exhaust line, and means for securing the body in its folded relation about the exhaust line.

JOHN R. OISHEI.